US011181315B2

(12) United States Patent
Costanza et al.

(10) Patent No.: US 11,181,315 B2
(45) Date of Patent: Nov. 23, 2021

(54) HYBRID INSULATING PANEL, FRAME, AND ENCLOSURE

(71) Applicant: KPS GLOBAL LLC, Fort Worth, TX (US)

(72) Inventors: James M. Costanza, Flower Mound, TX (US); Brian L. Reiger, Fort Worth, TX (US); Brian W. Ausburn, Fort Worth, TX (US)

(73) Assignee: KPS GLOBAL LLC, Fort Worth, TX (US)

( * ) Notice: Subject to any disclaimer, the term of this patent is extended or adjusted under 35 U.S.C. 154(b) by 0 days.

(21) Appl. No.: 16/582,147

(22) Filed: Sep. 25, 2019

(65) Prior Publication Data

US 2020/0096251 A1 Mar. 26, 2020

Related U.S. Application Data

(60) Provisional application No. 62/736,242, filed on Sep. 25, 2018.

(51) Int. Cl.
*F25D 23/06* (2006.01)
*F25D 13/00* (2006.01)
*F16B 5/00* (2006.01)

(52) U.S. Cl.
CPC ........... *F25D 23/063* (2013.01); *F25D 13/00* (2013.01); *F16B 5/0084* (2013.01); *F25D 2201/126* (2013.01)

(58) Field of Classification Search
CPC ...... F25D 23/065; F25D 2201/10; E04C 2/38; E04C 2/284
See application file for complete search history.

(56) References Cited

U.S. PATENT DOCUMENTS 2,808,624 A * 10/1957 Sullivan ................ E04B 1/6116
                                                                     52/396.06
3,256,663 A * 6/1966 Bishop ...................... E04B 1/76
                                                                     52/395

(Continued)

FOREIGN PATENT DOCUMENTS

EP       1333129 A1    8/2003
EP       1903072 A1    3/2008

OTHER PUBLICATIONS

International Application No. PCT/US2019/052848, International Search Report and Written Opinion, dated Nov. 27, 2019.

(Continued)

*Primary Examiner* — Babajide A Demuren
(74) *Attorney, Agent, or Firm* — Marshall, Gerstein & Borun LLP

(57) ABSTRACT

An enclosure for use as a walk-in freezer or refrigerator includes a first panel and a second panel connected to the first panel. Each of the first and second panels includes a body having a frame coupled to the body. The frame includes a beam of a first material and a jacket of a second material at least partially enclosing the beam. An interior edge of the frame is adjacent to the body. An exterior edge is defined by the jacket and defines a joint member. The joint member of the first panel defines a groove, and the joint member of the second panel defines a protrusion adapted to engage the groove of the joint member of the first panel. At least one joint member includes a deformable portion that compresses when the joint member of the first panel engages with the joint member of the second panel.

37 Claims, 10 Drawing Sheets

(56) References Cited

U.S. PATENT DOCUMENTS

| | | | |
|---|---|---|---|
| 4,758,299 A | 7/1988 | Burke | |
| 5,512,233 A | 4/1996 | Gallagher et al. | |
| 5,638,651 A * | 6/1997 | Ford | E04C 2/246 |
| | | | 52/265 |
| 5,938,878 A | 8/1999 | Hurley et al. | |
| 6,718,721 B2 | 4/2004 | Albany et al. | |
| 7,566,475 B2 | 7/2009 | Connelly et al. | |
| 7,752,822 B2 | 7/2010 | Minelli | |
| 7,790,274 B2 | 9/2010 | Monk et al. | |
| 8,776,472 B1 * | 7/2014 | Kinser, Jr. | E04B 1/80 |
| | | | 52/582.2 |
| 9,389,013 B2 | 7/2016 | Rolek et al. | |
| 10,011,989 B2 * | 7/2018 | Pence | E04C 2/296 |
| 2005/0204697 A1 * | 9/2005 | Rue | E04B 1/14 |
| | | | 52/782.1 |
| 2006/0099383 A1 | 5/2006 | Connelly et al. | |
| 2007/0221324 A1 | 9/2007 | Monk et al. | |
| 2008/0032102 A1 | 2/2008 | Monk et al. | |
| 2008/0163587 A1 | 7/2008 | Monk et al. | |
| 2009/0308007 A1 | 12/2009 | Monk et al. | |
| 2011/0120039 A1 | 5/2011 | Minelli | |
| 2012/0121322 A1 * | 5/2012 | Minelli | F25D 23/063 |
| | | | 403/288 |
| 2018/0058748 A1 * | 3/2018 | Costanza | E04C 2/296 |
| 2018/0073797 A1 | 3/2018 | Taqi et al. | |
| 2019/0145699 A1 * | 5/2019 | Mellits | F25D 23/067 |
| | | | 312/406 |

OTHER PUBLICATIONS

KPS Global®, FUSIONFRAME™ product sheet, Apr. 2018.
KPS Global®, Insulated Panel Systems Product Details, brochure, Aug. 2017.
International Application No. PCT/US2010/057303, International Search Report and Written Opinion, dated Feb. 11, 2011.
International Preliminary Report on Patentability in the Corresponding PCT/US2010/057303 dated Jan. 26, 2012.

* cited by examiner

HYBRID INSULATING PANEL, FRAME, AND ENCLOSURE

FIELD OF DISCLOSURE

The present disclosure generally relates to insulation panels, and more particularly, to a hybrid panel, a hybrid panel frame, and a freezer or refrigerated enclosure composed of hybrid panels.

BACKGROUND

Freezers or refrigerated enclosures, such as refrigerated display cases and storage units, are typically constructed with a frame made of a material that either has high insulative properties or high structural reliability, but not both. For example, structurally reliable materials used for the frame, such as wood, steel, aluminum, have a low R value (i.e., thermal resistivity) and allow heat to enter the refrigerated enclosure through a frame joint (i.e., vertical joint between panels of the enclosure). In other examples, the frame is a high-density rail ("HDR") that is a better insulator, but often lacks structural integrity and reliability. A frame joint that is formed of HDR has a weaker structural performance than a wood frame joint, for example, and therefore has limited applications. Thus, an HDR frame is typically used in a freezer or refrigerated panel or enclosure for low load-bearing applications. In these applications, the structural performance of the panel or enclosure is traded for a higher thermal resistivity. That is, thermal resistivity (i.e., R value) will be optimized, but structural performance of the panel or enclosure would consequently be diminished. It follows that a wood frame is typically used in a freezer or refrigerated panel or enclosure for applications that require a high strength capacity. Accordingly, a manufacturer must weigh the importance of high R value versus strength when choosing between a wood or an HDR frame.

SUMMARY

In accordance with a first exemplary aspect, an enclosure for use as a walk-in refrigerator or freezer may include a wall including a first panel and a second panel connected to the first panel. Each of the first and second panels may include a body having a first end and a second end, and a frame coupled to at least one of the first and second ends of the body. The frame may include a beam of a first material and a jacket of a second material at least partially enclosing the beam. An interior edge of the frame may be adjacent to the body and an exterior edge of the frame may be defined by the jacket and opposite the interior edge. The exterior edge may define a joint member. The joint member of the first panel may define a groove formed in the exterior edge of the frame. The joint member of the second panel may define a protrusion extending from the exterior edge of the frame and adapted to engage the groove of the joint member of the first panel. At least one joint member of the first and second panels may include a deformable portion that compresses when the joint member of the first panel engages with the joint member of the second panel.

In accordance with a second exemplary aspect, a frame joint for a freezer or refrigerated wall may include a first frame of an insulated panel. The first frame may include a beam of a first material and a jacket of a second material. The jacket may at least partially enclose the beam such that the beam is embedded in the jacket. The frame joint may include a second frame of an insulated panel. The second frame may be arranged to couple to the first frame, and may include a beam of the first material and a jacket of the second material. The jacket may at least partially enclose the beam such that the beam may be embedded in the jacket. The frame joint may include a mating surface defined in the jacket of the first frame, a mating surface defined in the jacket of the second frame, and a thickness of at most six inches. The frame joint may include an R value of at least R5 per inch when the mating surface of the first frame is sealingly coupled to the mating surface of the second frame.

In accordance with a third exemplary aspect, a panel for a freezer or refrigerated wall may include a body having a first end and a second end and a frame operably coupled to the first end of the body. The frame may include a beam of a first material and a jacket of second material. The jacket may at least partially enclose the beam so that the beam is integrated with the jacket. An interior edge of the frame may be coupled to the first end of the body and an exterior edge of the frame may define a mating surface arranged to engage with a second frame to define a frame join. The first material may have a flexural strength greater than a flexural strength of the second material.

In further accordance with any one or more of the foregoing first, second, and third aspects, an enclosure, a panel, and/or a frame joint may include any one or more of the following preferred forms.

In a preferred form, the joint member of the first panel and the joint member of the second panel may be coupled by interference fit to form a frame joint.

In a preferred form, the frame joint of the first and second panels may have a thickness in a range of approximately 3.5 inches to approximately 6 inches and an R value in a range of approximately 15 to approximately 29.

In a preferred form, the joint member of the first panel and the joint member of the second panel may form an air-tight seal when the frame of the first panel is coupled to the frame of the second panel.

In a preferred form, a locking assembly may be arranged to couple the first panel to the second panel from an unlocked configuration to a locked configuration. The locking assembly may include a hook attached to one of the first and second panels and a pin attached to the other one of the first and second panels. The joint member of the first panel and the joint member of the second panel may engage when the locking assembly is in the locked configuration.

In a preferred form, the first panel may include a second frame coupled to the second end of the body. The second frame may include a joint member arranged to engage a frame of a different panel.

In a preferred form, the joint member of the second frame may define a protrusion extending from an exterior surface of the joint member.

In a preferred form, the joint member of the second frame may define a groove defined in an exterior surface of the joint member.

In a preferred form, the jacket may include a foam material having a first density and the body may include a foam material having a second density different than the first density.

In a preferred form, a ratio of first density to second density may be in a range of approximately 4:3 to approximately 3:1.

In a preferred form, the first frame may have a composition ratio of first material to second material of approximately 2:3.

In a preferred form, metal plating may be adjacent to the foam material of the body.

In a preferred form, a ceiling may be coupled to the wall and may include a third panel. The third panel may include a body having a first end and a second end, and a frame coupled to the first end of the body. The frame may include a beam of the first material, and a jacket of the second material at least partially enclosing the beam.

In a preferred form, a floor may be coupled to the wall and may include a fourth panel. The third panel may include a body having a first end and a second end, and a frame coupled to the first end of the body. The frame may include a beam of the first material, and a jacket of the second material at least partially enclosing the beam.

In a preferred form, the first panel and the second panel may be co-linear.

In a preferred form, a gasket may be disposed between the frame of the first panel and the frame of the second panel.

In a preferred form, the mating surface of the first frame may define a deformable portion that compresses when the mating surface of the first frame engages with the mating surface of the second frame.

In a preferred form, the mating surface of the first frame may define a groove in the jacket of the first frame. The mating surface of the second frame may define a protruding member extending from the jacket the second frame. A portion of the jacket of the first frame may be compressible when the protrusion engages with the groove.

In a preferred form, the beam of the first frame may have a flexural strength greater than a flexural strength of the jacket.

In a preferred form, the frame may have a flexural strength in a range of approximately 800 psi to approximately 1000 psi, and a total R value in a range of 19 to approximately 25.

In a preferred form, the frame may have a composition ratio of first material to second material in a range of approximately 1:2 to approximately 1:4.

In a preferred form, the frame may have a composition ratio of first material to second material of approximately 2:3.

In a preferred form, the body may have a density of the second material and the jacket may have a density different than the density of the body.

In a preferred form, the second material may be a hydrophobic material.

In a preferred form, the beam may be disposed between the body and the jacket.

In a preferred form, the first material may be a wood and the second material may be a foam.

In a preferred form, the mating surface of the jacket may include a compressible portion extending away from the exterior edge.

In a preferred form, a metal sheath may enclose the body and at least partially enclose the frame.

DETAILED DESCRIPTION

A hybrid panel, a hybrid panel frame, and a freezer or refrigerated enclosure composed of hybrid panels according to the present disclosure are constructed to improve upon thermal performance, structural performance, energy performance, and life-cycle. The disclosed hybrid insulation panel combines the structural performance of a wood or composite beam with the high thermal performance of foam insulation, providing a member resistant to degradation and that may help increase energy savings while decreasing overall unusable space within the retail footprint of a freezer or refrigerated enclosure. The hybrid panel may be used in a freestanding unit, such as a freezer or refrigerated enclosure or display case, and a built-in unit, such as a replacement panel of an existing freezer or refrigerated enclosure or a wall liner of a vehicle.

Figure 1:
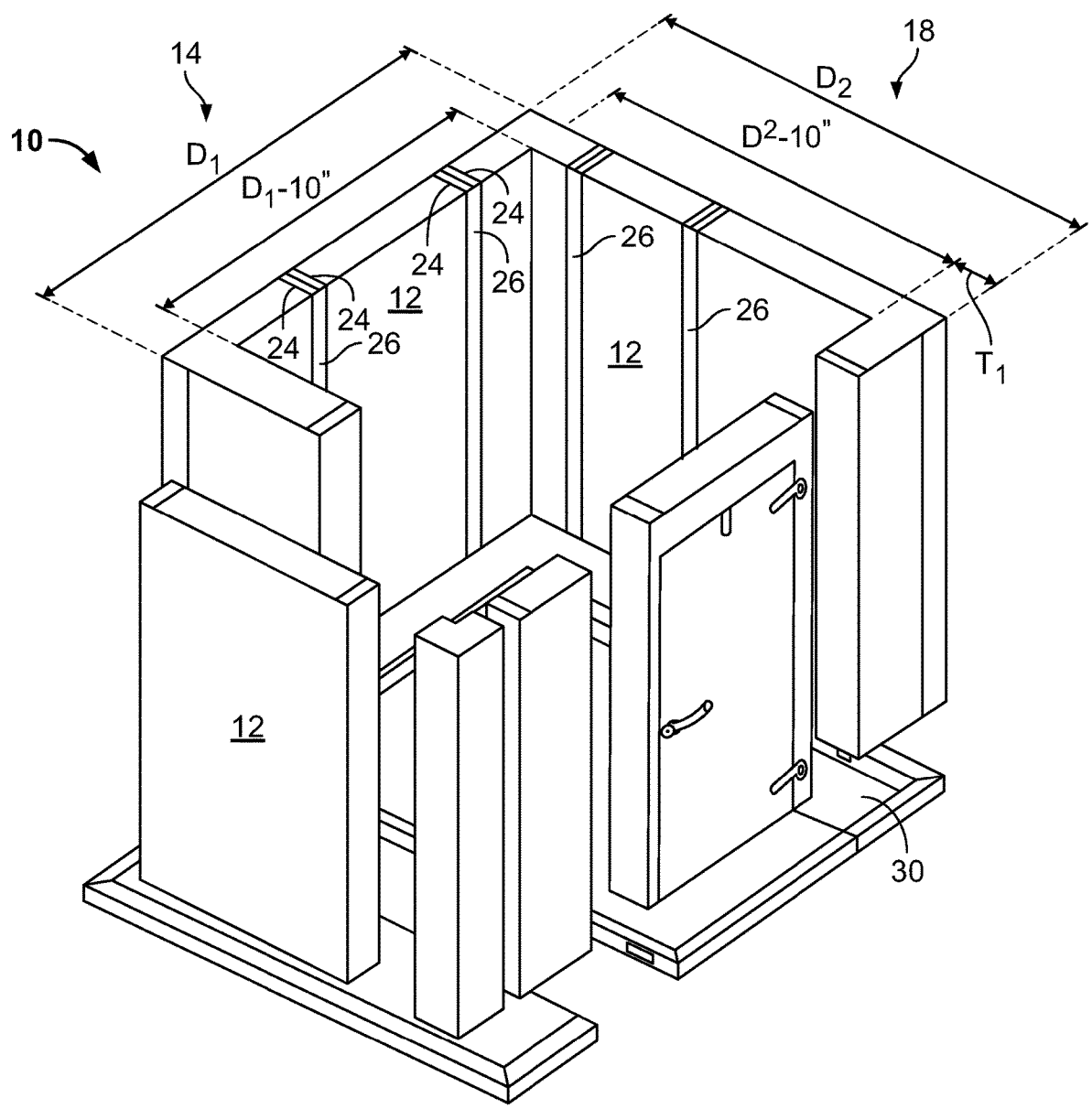
FIG. 1 is a partial, exploded view of a freezer or refrigerated enclosure known in the art.
Figure 2:
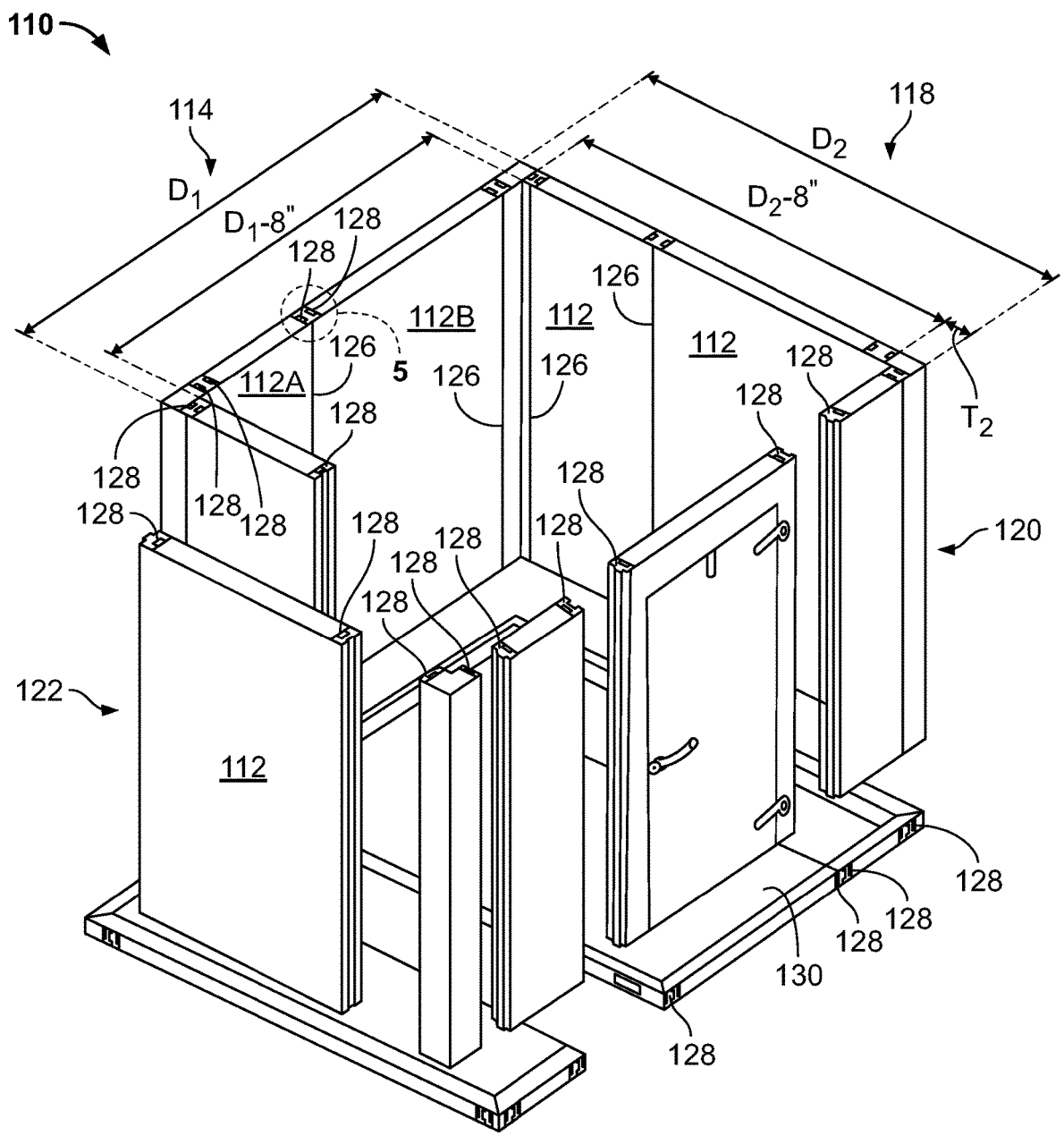
FIG. 2 is a partial, exploded view of a freezer or refrigerated enclosure constructed with one or more hybrid panels in accordance with the teachings of the present disclosure.

FIG. 1 depicts an example of a conventional wood-framed freezer or refrigerated enclosure 10, and in FIG. 2, a hybrid-framed freezer or refrigerated enclosure 110 is constructed according to the teachings of the present disclosure. In FIG. 1, the conventional wood-framed freezer has a wooden frame 24 disposed between the insulated panels 12. While wood is structurally reliable, wood has low thermal resistivity compared to a hybrid frame, as will be discussed below. Due to poor insulative properties, or low R value, of the wooden frame (e.g., R 1.25 per inch), each panel 12 has a foam core with a minimum thickness, for example, of 5 inches to make up for the heat loss through the wooden frames 24 at the frame joints 26 of the enclosure 10. By comparison to FIG. 2, the thickness T1 of each panel 12 and joint 26 of the conventional wood-framed freezer or refrigerated enclosure 10 is greater than a thickness T2 of a hybrid panel 112 and frame joint 126 of the present disclosure, because the hybrid frame joint 126 has a higher R value per inch allowing for a thinner panel. The foam core may be instead asbestos, fiberglass, or other well-known insulation materials. For simplicity and to the extent possible, components of the conventional wood-framed enclosure 10 and like components of the hybrid-framed enclosure 110 are numbered similarly, except components of the hybrid-framed enclosure 110 are increased by 100.

The hybrid enclosure 110 of FIG. 2 is constructed to reduce energy loss by minimizing the amount of heat that penetrates the enclosure 110 (e.g., via the frame joints 126) such that the refrigeration unit (not shown) does less work to remove heat and maintain a desired interior temperature of the freezer or refrigerated enclosure 110. As illustrated in FIG. 2, a hybrid frame 128 is disposed between each insulated panel 112 of the hybrid enclosure 110. The hybrid frame 128 has a higher thermal resistivity (i.e., R value) per inch (in thickness) than a wooden frame, and thus better resists heat from penetrating the enclosure 110 via the frame joints 126. Each hybrid panel 112 of the enclosure 110 can reach higher R values with thinner panel thicknesses than the wood-framed enclosure 10 because the hybrid enclosure 110 can better maintain the internal temperature. For example, the hybrid frame 128 may have a thickness T2 in a range of approximately three and a half (3.5) inches to approximately six (6) inches, and an R value in a range of fifteen (15) to twenty nine (29), whereas a wooden frame 28 has a thickness T1 (FIG. 1) in a range of approximately three and a half (3.5) to six (6) inches, and an R value in a range of four (4) to seven (7). Thus, each panel 112 of the hybrid enclosure 110 may require less insulation material, occupy a smaller footprint, and achieve a higher thermal performance than the panels 12 of the conventional enclosure 10.

The thermal resistivity of foam generally changes with temperature. Typically, a foam material performs better (i.e., has a higher R value) at lower temperature ranges. For example in Table 1 below, R values for foam of an HDR frame, a hybrid frame, and a panel are higher in a freezer application, where the temperature is around 20° F., than in a refrigerated application, where the temperature is around 55° F. The results in Table 1 were determined following C518 ASTM standards.

TABLE 1

Comparison of R value in Freezer and Refrigerator Applications

| Frame Type | Foam Density (lb/ft$^3$) | R Value - Freezer at 20° F. (BTU/h) | R Value - Refrigerator at 55° F. (BTU/h) |
|---|---|---|---|
| Wood Rail | SPF* | 1.25/inch | 1.25/inch |
| HDR Rail Foam | 12 | 3.9/inch | 3.65/inch |
| Hybrid Rail Foam | 5 | 7.35/inch | 6.6/inch |
| Panel Foam | 2.2 | 8.06/inch | 7.19/inch |

*SPF, meaning spruce, pine, or fir

Turning briefly back to FIG. 1, the conventional freezer enclosure 10 has a D1×D2 footprint, where a first side 14 has a length D1, a second side 18 has a length D2, and each panel 12 is the thickness T1 of at least four (4) to five (5) inches (a refrigerator enclosure three (3) to five (5) inches, and an extreme freezer around six (6) inches). Thus, an area A of usable space is the D1×D2 footprint less the total thickness T1 of the panels 12, which would equal (D1−10 inches)×(D2−10 inches), where each panel has a thickness T1 of 5 inches. As shown in FIG. 2, the hybrid-framed enclosure 110 has the same D1×D2 footprint, however, each panel 112 has the smaller thickness T2, which may be, for example, three and a half (3.5) to four (4) inches, because the hybrid frame 128 has a higher R value per inch allowing thinner walls for the same R value. Thus, the usable area (i.e., area for storage) of the hybrid-framed freezer or refrigerated enclosure 110 is equal to (D1−8 inches)×(D2−8 inches), where each panel has a thickness T2 of four (4) inches. As shown by comparing the usable area of FIGS. 1 and 2, the hybrid-framed enclosure 110 provides more useable area, and therefore more total volume for storage, than the conventional wood-framed enclosure 10. In yet another example where the useable area is the same, a hybrid-framed enclosure 110 would have a smaller overall footprint than a conventional wood-framed enclosure 10, allowing wider consumer aisle space with the same useable area for frozen (or refrigerated) retail storage and display.

Generally, the freezer or refrigerated enclosure 110 of FIG. 2 is a walled walk-in freezer or refrigerated enclosure that may be constructed by connecting a plurality of hybrid insulating panels 112 to provide first, second, third, and fourth sides 114, 118, 120, 122, flooring 130, and a ceiling (not shown). For simplicity, the enclosure 110 described herein is a freezer. The enclosure 110 includes corner panels, wall panels, ceiling panels, and floor panels, and each panel 112 includes at least one hybrid frame 128. The illustrated enclosure 110 has two to three hybrid panels 112 (including corner panels) per side, 114, 118, 120, 122, but other example enclosures 110 may be constructed having more or less hybrid panels per side. The hybrid panels 112 may be of the same or similar composition in terms of materials and components, or the enclosure 110 may be composed of hybrid panels 112 having different compositions of materials. In particular, each panel 112 generally includes a frame 128 for each of the four sides of the panel 112 to connect to adjacent wall panels, a ceiling panel, and a floor panel. In the figures, however, only two frames 128 for each hybrid panel 112 are shown. Turning specifically to the first side 114 of the enclosure 110, for example, a first panel 112A is connected to a second panel 112B to form a frame joint 126.

Figure 3:
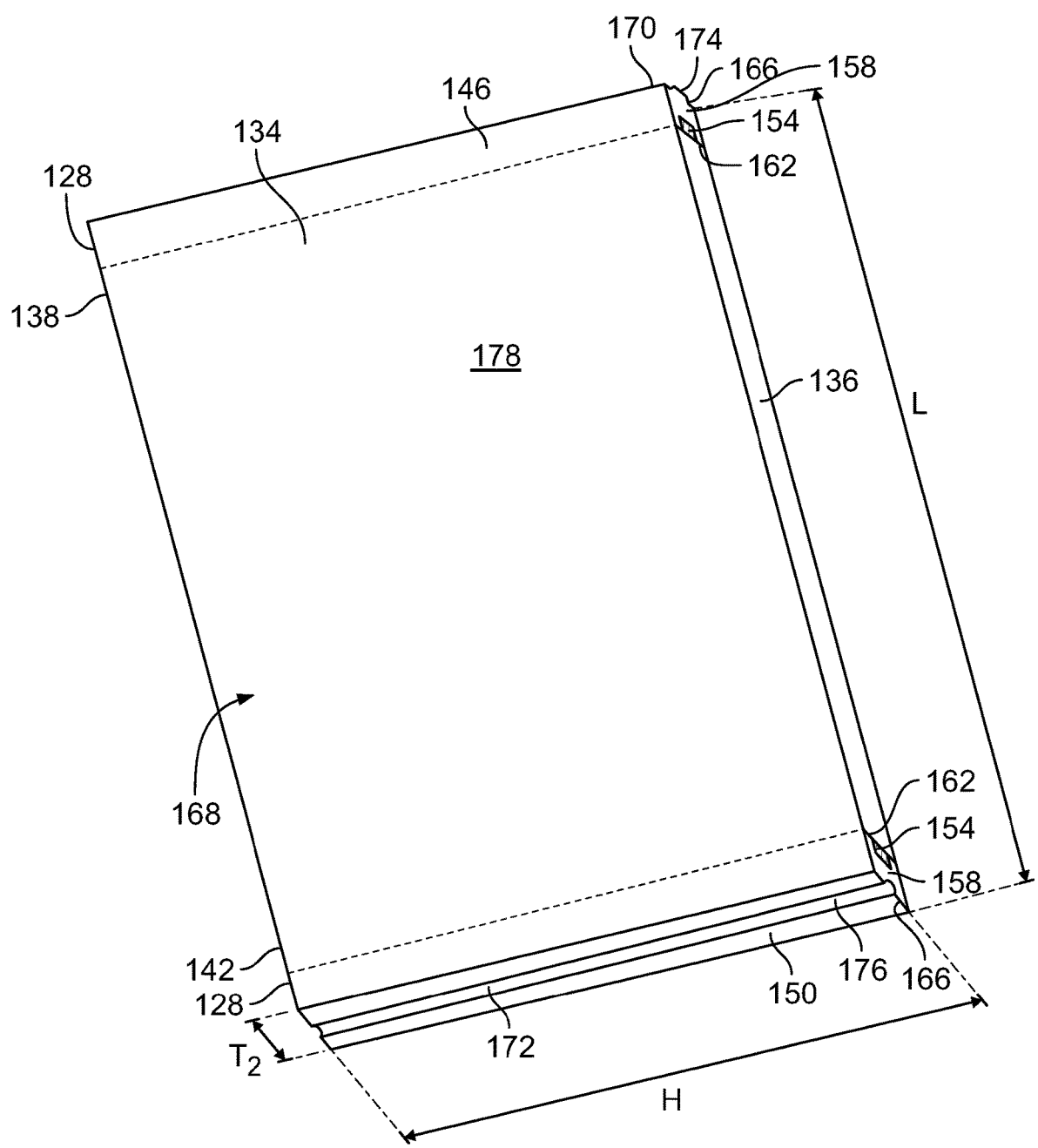
FIG. 3 is a perspective view of a hybrid insulation panel of the freezer or refrigerated enclosure of FIG. 2.

In FIG. 3, an example hybrid panel 112 of the freezer or refrigerated enclosure 110 is illustrated, which is constructed in accordance with the teachings of the present disclosure. The hybrid panel 112 includes a body 134 having a foam core 136, a first end 138, a second end 142, and a hybrid frame 128 coupled to each of the first and second ends 138, 142, and labeled specifically as a first frame 146 and a second frame 150. At the first end 138 of the body 134, the first hybrid frame 146 is attached to the panel body 134 and includes a beam 154 of a first material and a jacket 158 of a second material at least partially enclosing the beam 154. The beam 154 of the hybrid frame 146, 150 may be plywood, lumber, magnesium oxide, gypsum, rigid plastic, fiberglass, carbon fiber, Kevlar, fiberglass reinforced plastic resin, or other rigid material. The first frame 146 is coupled to the panel body 134 at an interior edge 162 of the frame 146, and the jacket 158 defines an exterior edge 166 providing a joint member 170. The second frame 150 defines a joint member 172 that is arranged to couple to a joint member constructed similarly to accept the joint member 170 of the first frame 146. In particular, the joint member 170 of the first frame 146 defines a protrusion 174, and the joint member 172 of the second frame 150 defines a groove 176 for a tongue and groove coupling joint. The illustrated beam 154 is rectangular, but may have different shapes for structural performance and/or bonding with the material of the jacket 158. In one example, the beam 154 may include a channel such that the beam 154 has a "C" shape. Additionally, the illustrated beam 154 is one material, however, in other examples, the beam 154 may be composed of one or more materials. For example, the beam 154 may be a rectangular tube (of any of the rigid materials provided above) that is filled with polyurethane foam.

Figure 4:
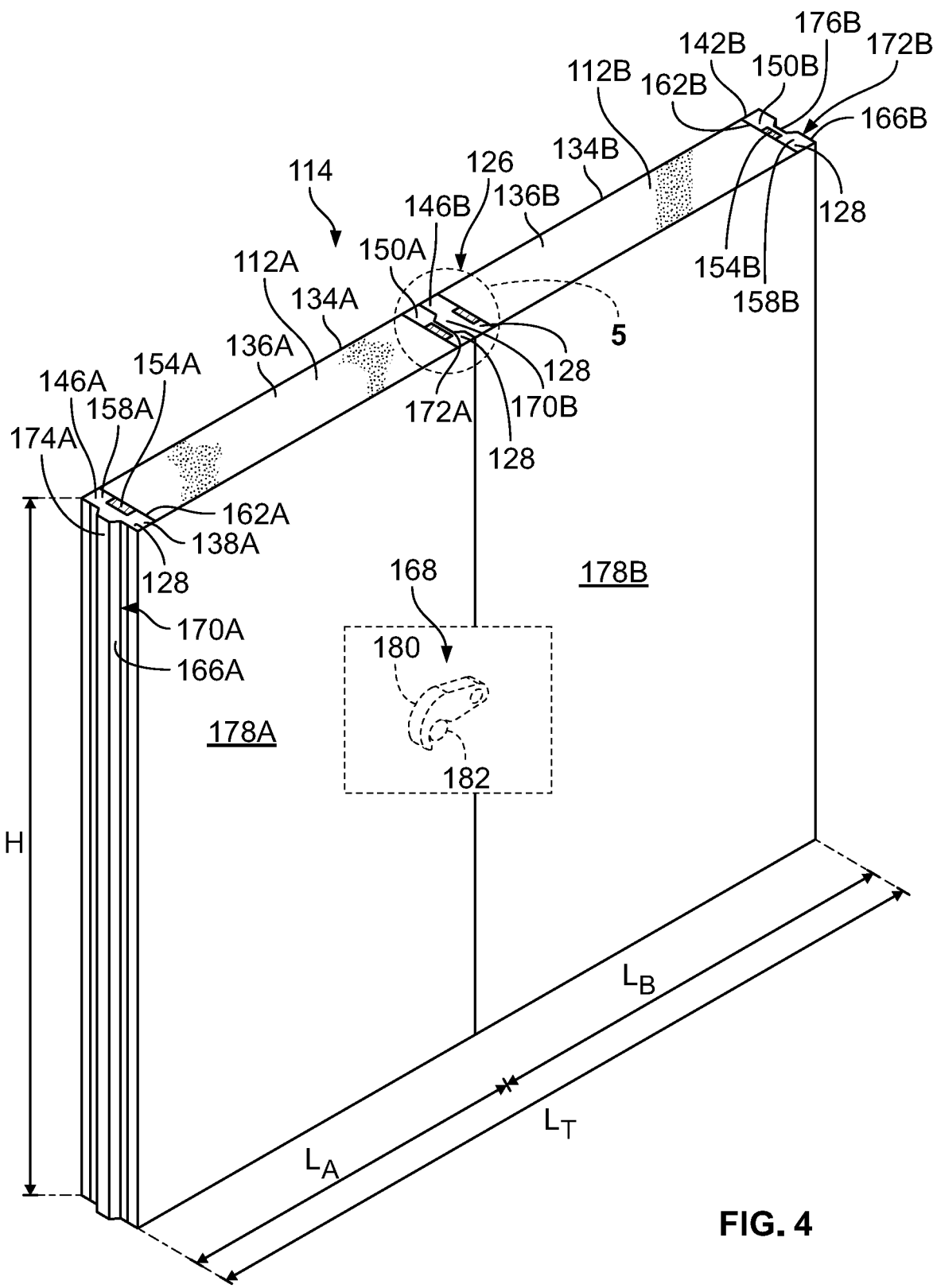
FIG. 4 is a perspective view of the hybrid insulation panel of FIG. 3 coupled to a second hybrid insulation panel of a side wall of the freezer or refrigerated enclosure of FIG. 2.

The joint member 170 of the first frame 146 is arranged to couple to an adjacent joint member of a different frame, thereby coupling two hybrid panels 112 and forming an insulated wall or side 114 of the enclosure 110, for example, of FIG. 2. As shown in FIG. 3, the first frame 146 attached to the first end 138 of the body 134 defines a protrusion 174 extending along a height H of the body 134 and is different than a joint member 172 of the second frame 150, which defines a groove 176 extending along the height H of the body 134. Each joint member 170, 172 is constructed to mate with another joint member 172, 170 to form a sealed connection between two hybrid panels 112A, 112B as shown in FIG. 4 and discussed further below. However, in another example, the panel body 134 can include two identical frames (e.g., each with a protrusion so that the panel has a male-male configuration, or each with a groove so that the panel has a female-female configuration) attached to the first and second ends 138, 142 of the body 134. In another example, the panel 112 can include one frame 128 attached to either the first end 138 or the second end 142 of the body 134. The panel body 134 may have any suitable cross-sectional shape or shapes between the first end 138 and the second end 142 of the body 134. For example, an interior surface of the panel 112 may be parallel with an exterior surface (hidden from view) such that the body 134 has a uniform (or substantially uniform) thickness T2 along a length L of the panel. A metal skin 178, described further below, protects the body 134 of the panel.

Figure 5:
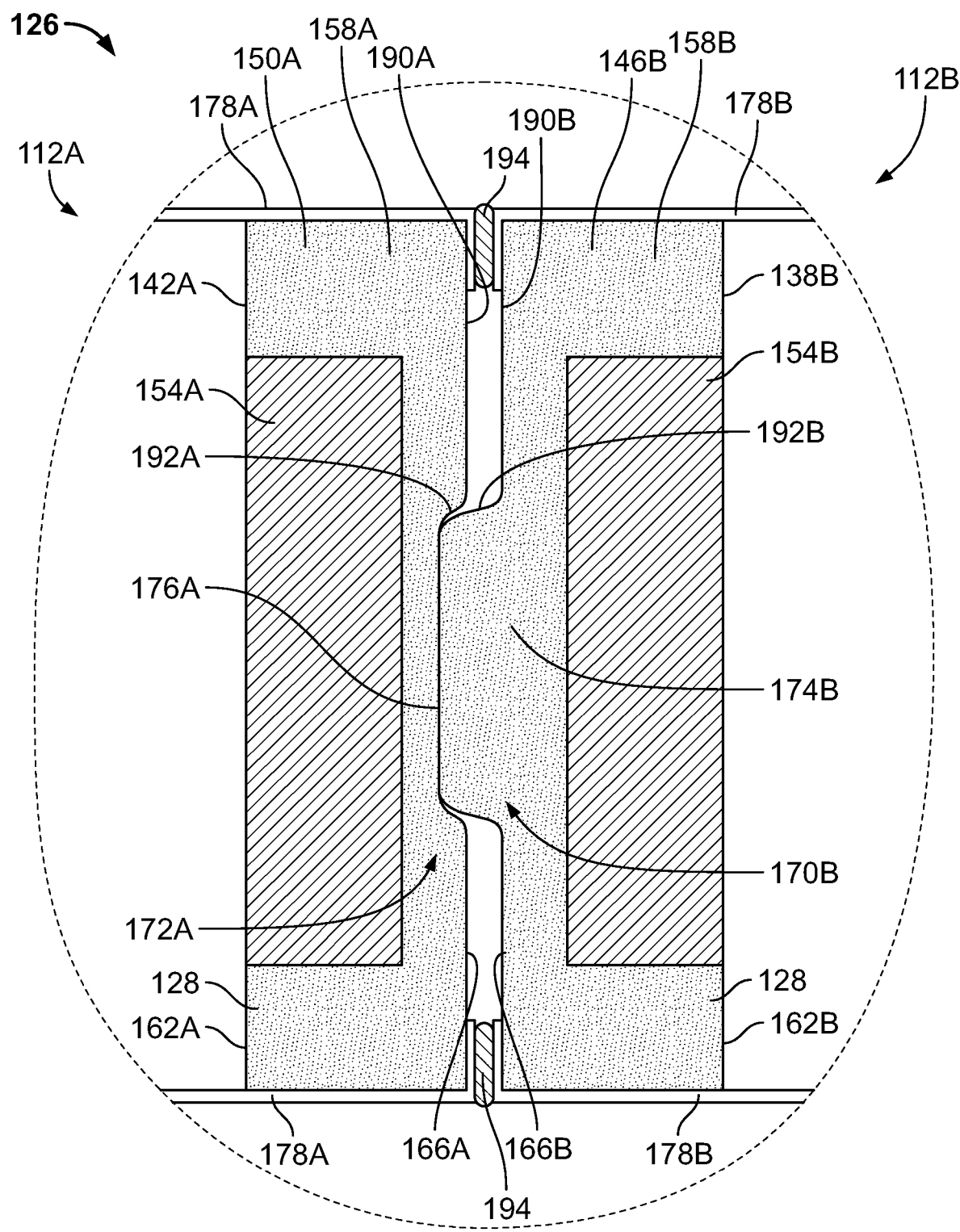
FIG. 5 is a cross-sectional view of a hybrid frame joint formed between the frames of the first hybrid panel and the second hybrid panel of FIG. 4.

Referring now to FIGS. 4 and 5, the first hybrid panel 112A and the second hybrid panel 112B of the first side 114 of the freezer or refrigerated enclosure 110 are shown in more detail. In the illustrated example, the hybrid panels 112A, 112B are substantially similar such that each panel 112A, 112B has a body 134A, 134B, a foam core 136A, 136B, a first frame 146A, 146B, a second frame 150A, 150B, and other components previously described and illustrated with reference to the hybrid panel 112 of FIG. 3. For simplicity and to the extent possible, components of the hybrid panel 112 and like components of the hybrid panels 112A, 112B are numbered similarly, except components of the first panel 112A (depicted on the left in FIG. 4) are indicated by a letter 'A,' and components of the second panel 112B (depicted on the right in FIG. 4) are indicated by a letter 'B.' The second frame 150A of the first panel 112A is operably coupled to the first frame 146B of the second panel 112B to form a frame joint 126 of a side wall 114. In particular, the first joint member 170A, 170B of the first frame 146A, 146B of each panel 112A, 112B defines a protrusion 174A, 174B extending outwardly from the exterior edge 166A, 166B of each jacket 158A, 158B. The second joint member 172A, 172B of the second frame 150A, 150B of each panel 112A, 112B defines a groove 176A, 176B adapted to receive a protrusion of a different panel. As shown in the magnified view of the joint 126 in FIG. 5, the groove 176A of the second frame 150A of the first panel 112A engages with the protrusion 174B of the first frame 146B of the second panel 112B.

Figure 6:
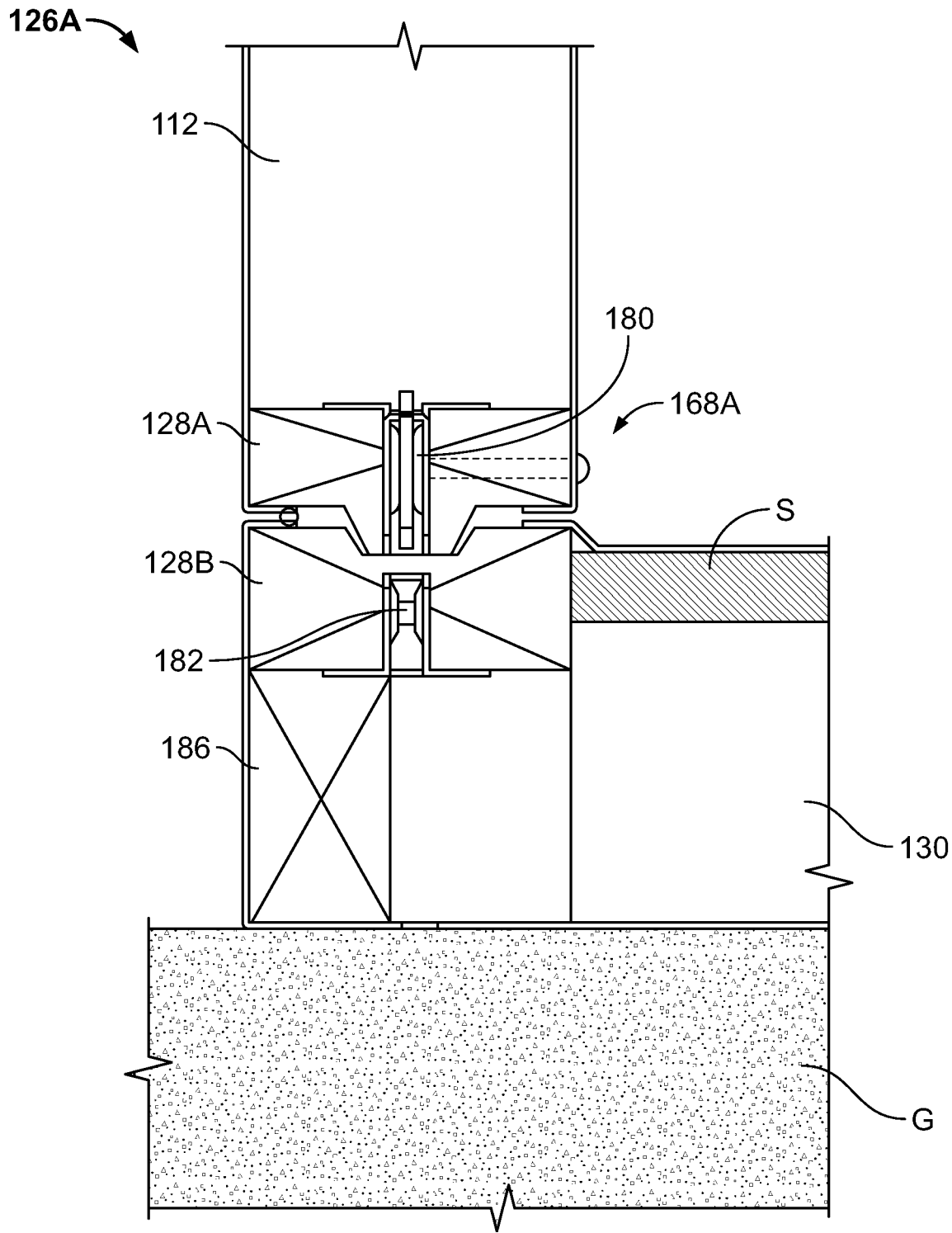
FIG. 6 is a partial, cross-sectional view of a hybrid frame joint formed between frames of a hybrid wall panel and a hybrid floor panel.
Figure 7:
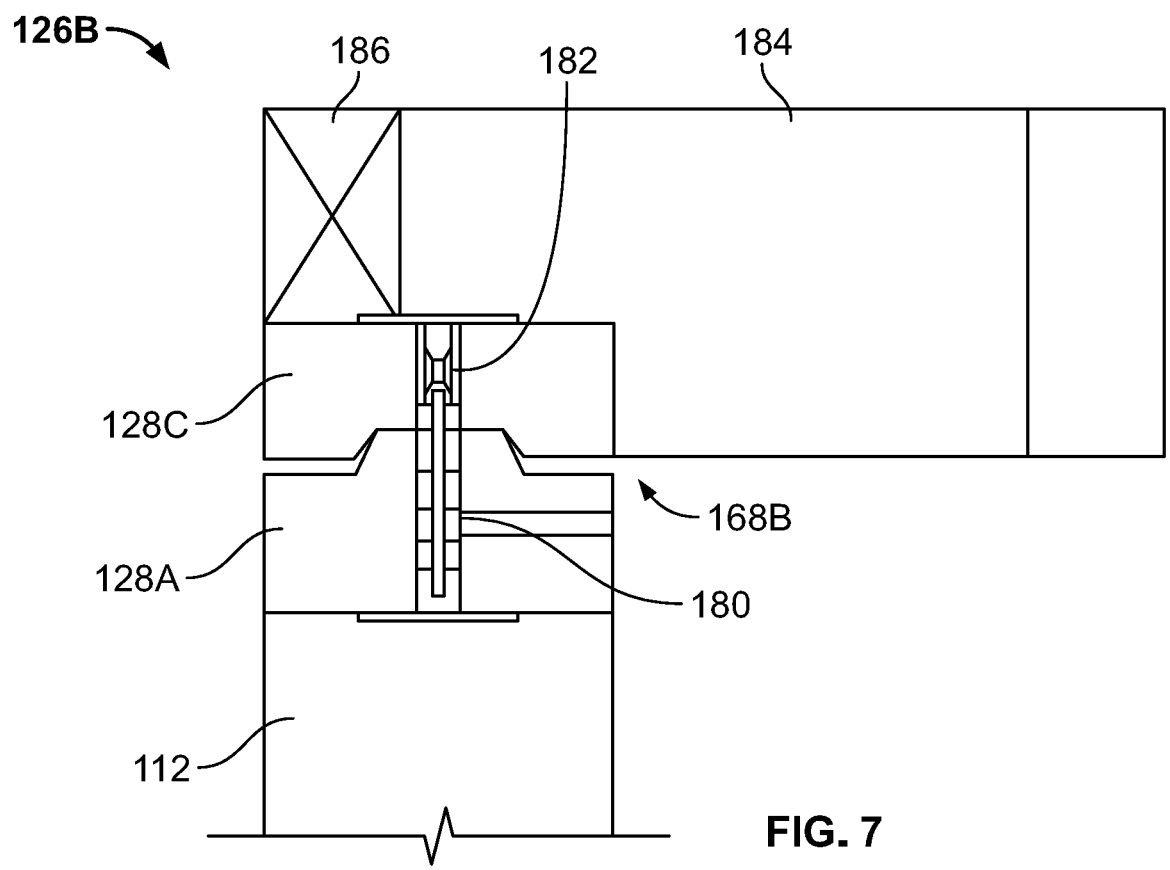
FIG. 7 is a partial, cross-sectional view of a hybrid frame joint formed between frames of a hybrid wall panel and a hybrid ceiling panel.

The first panel 112A and the second panel 112B may be locked together via a panel locking assembly 168, shown in dashed lines in FIG. 4. The panel locking assembly 168 may secure adjacent panels, such as first and second wall panels 112A, 112B, as shown in FIG. 5, a wall panel 112 and a floor panel 130, as shown in FIG. 6, and/or a wall panel 112 and a ceiling panel 184, as shown in FIG. 7. For example, in FIG. 4, a hook 180 attached to the frame 146B of the second panel 112B is rotatable between an unlocked position, in which the first and second panels 112A, 112B are separable, and a locked position when the hook 180 engages a pin 182 attached to the hybrid frame 150A of the first panel 112A. The joint member 172A of the first panel 112A and the joint member 170B of the second panel 112B engage when the locking assembly 168 is in the locked configuration. When the two panels 112A, 112B are locked together, the interior surfaces the panels 112A, 112B partially define an interior compartment wall of the freezer or refrigerated enclosure 110.

In FIGS. 6 and 7, a perpendicular frame joint between a wall panel 112 and a floor panel 130 (FIG. 6) and between a wall panel 112 and a ceiling panel 184 (FIG. 7), respectively, are constructed according to the teachings of the present disclosure. In FIG. 6, a perpendicular frame joint 126A is defined between a hybrid frame 128A of the wall panel 112 and a hybrid frame 128B of the floor panel 130. The floor panel 130 is constructed similarly to the hybrid wall panels 112 previously described, and is placed against a horizontal ground surface G. Similar to the frame joint 126 of FIG. 5, the frame 128A of the wall panel 112 and the frame 128B of the floor panel 130 mate via a tongue and groove connection. The floor frame 128B includes a groove that is oriented perpendicular relative to the floor panel 130 to receive a protruding member of the wall frame 128A. Similar to the locking assembly 168 of FIG. 4, a locking assembly 168A secures the floor frame 128B and the wall frame 128A together, and includes a hook 180 secured to the wall frame 128A that rotatably locks to a pin 182 disposed in the floor frame 128B. The floor panel 130 also includes a different frame 186 that is perpendicular relative to the first frame 128B of the floor panel 130. Also shown, the floor panel 130 has a substrate layer S that provides additional protection to the core. The frame joint 126B of FIG. 7 is defined between the hybrid frame 128A of the wall panel 112 and a hybrid frame 128C of the ceiling panel 184. While the frame joints 126A, 126B include locking assemblies 168A, 168B, other example frame joints 126, 126A, 126B may include other locking mechanisms. It will be appreciated that the hybrid floor panel 130 and frame 128B, and the hybrid ceiling panel 184 and frame 128C are substantially similar to the hybrid panel 112 and frame 128 described herein, though some details are not illustrated in FIGS. 6 and 7 for simplicity. However, in other examples, one or both of the ceiling and floor panels may be different.

Figure 8:
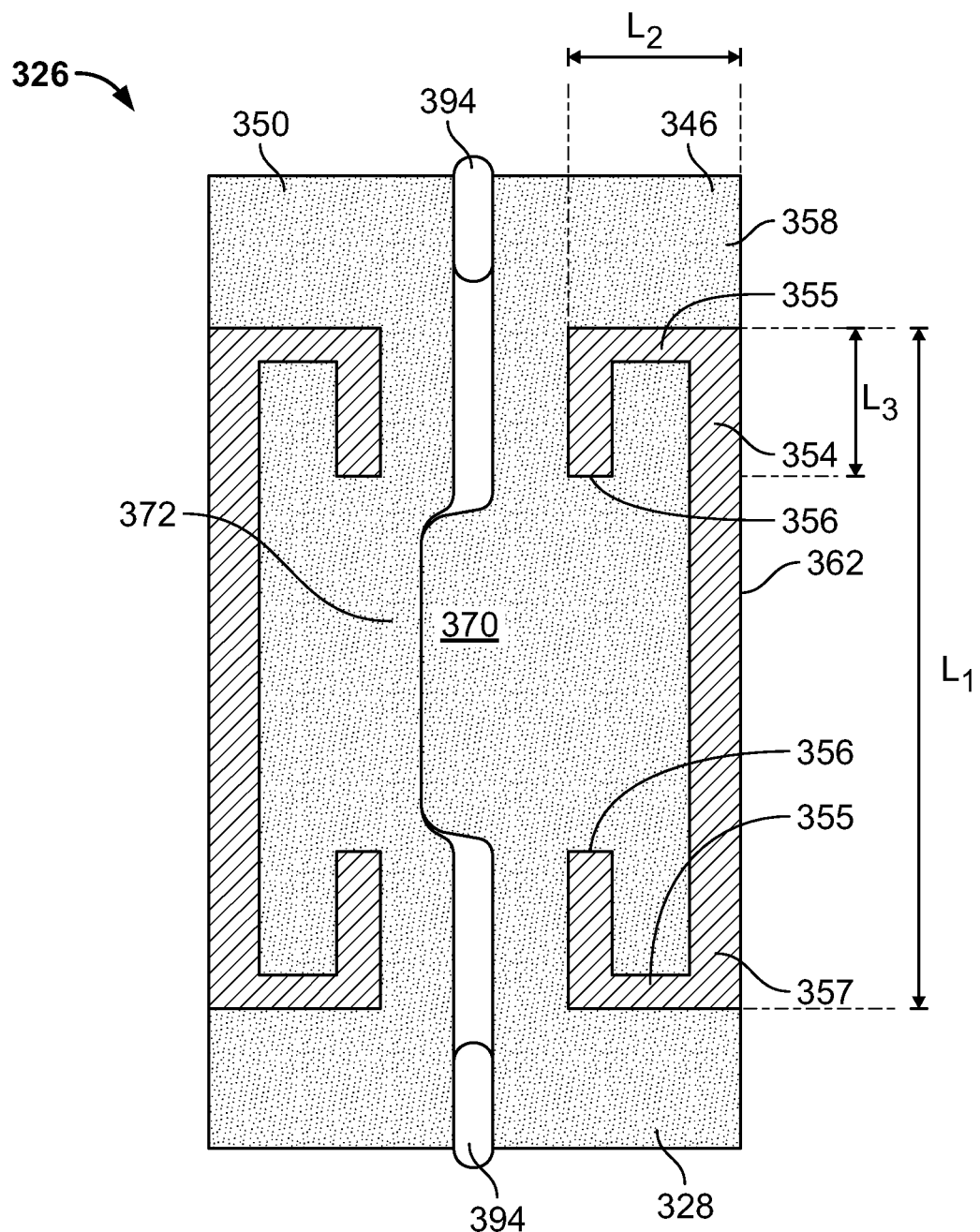
FIG. 8 is a cross-sectional view of a second exemplary hybrid frame joint constructed in accordance with the teachings of the present disclosure.

In FIG. 8, a second exemplary hybrid panel joint 326 is constructed according to the teachings of the present disclosure. The second exemplary hybrid panel joint 326 includes a male frame 346 and a female frame 350, and the joint 326 is similar to the first exemplary hybrid panel joint 126 of FIG. 5 described above. Thus, for ease of reference, and to the extent possible, the same or similar components of the second hybrid panel joint 326 and each frame 328 will retain the same reference numbers as outlined above with respect to the first exemplary hybrid panel joint, although the reference numbers will increase by 200.

By comparison to the first hybrid frame joint 126, the second exemplary hybrid frame joint 326 includes first and second hybrid frames 350, 346, where each frame 350, 346 has a C-shaped beam 354 enclosed in a foam jacket 358. As described above with respect to the previous examples, the beam 354 may be a plywood, lumber, magnesium oxide, gypsum, rigid plastic, fiberglass, carbon fiber, Kevlar, fiberglass reinforced plastic resin, or other rigid material. The beam 354 includes first and second parallel legs 355, where each leg 355 has a foot 356 and extends from a back wall 357 to form a C-shaped beam 354. The first and second parallel legs 355 of the beam 354 extend away from the back wall 357 and toward a joint member 370 of the frame 346 at a ninety degree (90°) angle, and each foot 356 extends away from the leg 355 at a ninety degree (90°) angle. The first and second parallel legs 355 have a suitable length that permits the foam of the jacket 358 to reach each interior corner and surface of the C-shaped beam 354 during the manufacturing process. For example, the back wall 357 of the beam 354 of FIG. 7 has a length $L_1$ of 3.25 inches, each of the parallel legs 355 has a length $L_2$ of 0.75 inches, and each foot 356 has a length $L_3$ of 0.5 inches. However, in other examples, the beam 354 may provide different dimensions than the illustrated example, and, for example, may not include a foot 356 extending from each leg 355. Additionally, the first and second parallel legs 355 may extend from the back wall 357 at an angle greater than or smaller than ninety (90°) degrees.

Figure 9:
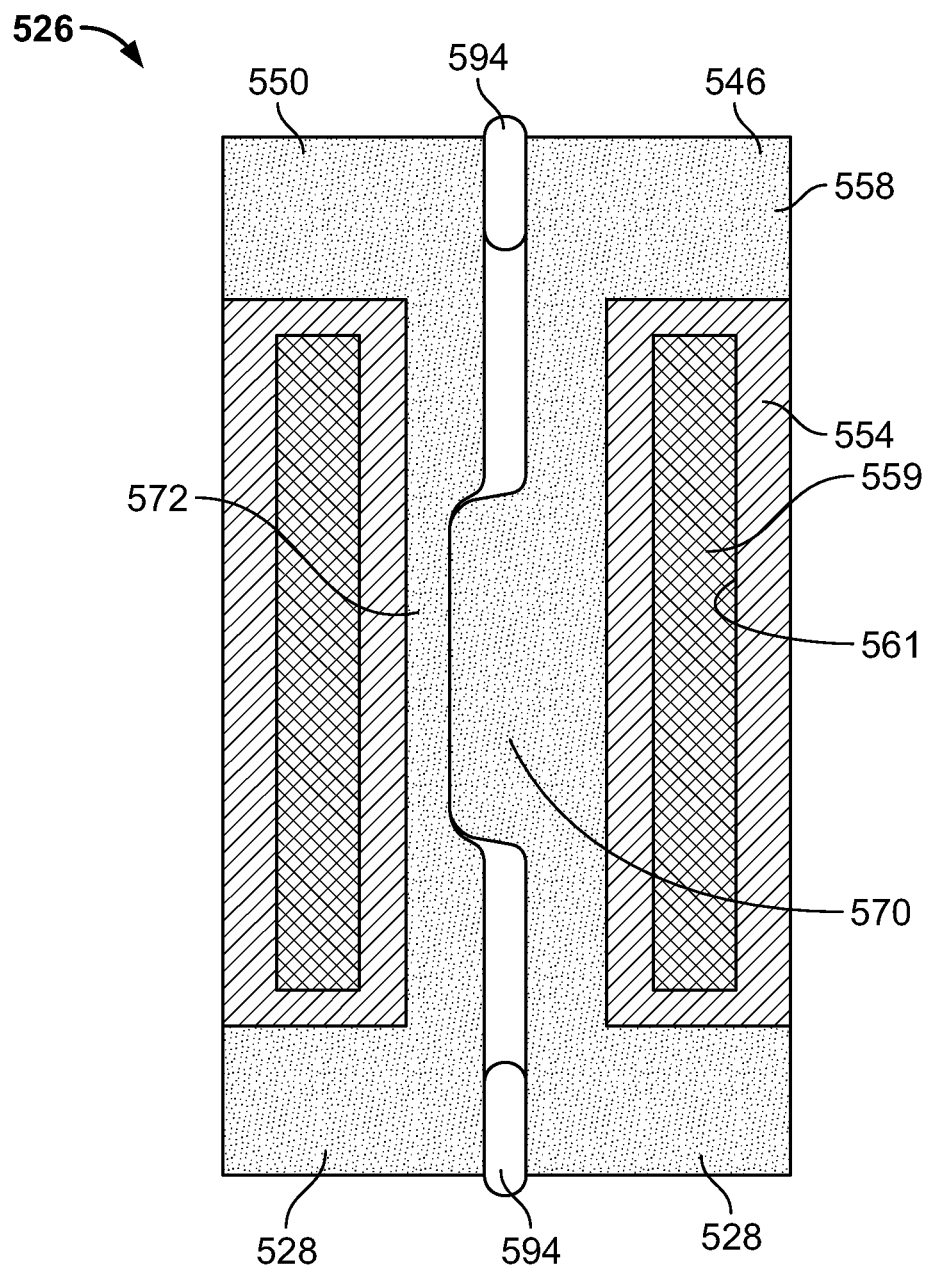
FIG. 9 is a cross-sectional view of a third exemplary hybrid frame joint constructed in accordance with the teachings of the present disclosure.

In FIG. 9, a third exemplary hybrid panel joint 526 is constructed according to the teachings of the present disclosure. The third exemplary hybrid panel joint 526 is similar to the first exemplary hybrid panel joint 126 of FIG. 5 described above. Thus, for ease of reference, and to the extent possible, the same or similar components of the third hybrid panel joint 526 will retain the same reference numbers as outlined above with respect to the first exemplary hybrid panel joint 126, although the reference numbers will increase by 400. By comparison to the first hybrid frame joint 126, the third exemplary hybrid frame joint 526 includes a male and female hybrid frames 546, 550, where each frame 546, 550 has a rectangular tube beam 554 filled with a foam material 559. The beam 554 of FIG. 9 includes a hollow cavity 561 that is filled with the foam material 559, forming a light-weight beam 554. The foam material 559 is different than the foam material of a jacket 558 enclosing the beam 554. However, in other examples, the foam material may be the same.

Turning back to FIGS. 4 and 5, each panel 112A, 112B is protected by a metal sheeting or metal skin 178A, 178B, respectively, to provide smooth interior and exterior surfaces. The panel body 134A, 134B of each panel 112A, 112B is plated with two metal sheets extending along a height H of the panel 112A, 112B and secured to each of the first and second frames 146A, 146B, 150A, 150B. The metal skins 178A, 178B may be parallel such that the panels 112A, 112B have parallel interior and exterior surfaces. Generally, to assemble a hybrid panel such as, for example, the first hybrid panel 112A, metal skins 178A are fastened to each side of the first and second frames 146A, 150A. A cavity formed between the metal skins 178A is filled with an insulation foam core filling 136A. The insulation core 136A bonds to interior edges 162A of the frames 146A, 150A and to the metal skin 178A while the foam insulation core 136A cures within the cavity. After the curing process is completed, a bond is formed between the foam core 136A and the metal skins 178A, and between the foam core 136A and the interior edges 162A of the frames 146A, 150A. While not illustrated in the example of FIG. 4, a frame 128 may be attached to both a top side and a bottom side of the panel 112 to attach to a floor and ceiling frame, respectively.

In the illustrated example of FIG. 5, the hybrid frames 150A, 146B of the first and second panels 112A, 112B are joined together to form an airtight frame joint 126. The jacket 158A, 158B of each frame 150A, 146B at least partially encloses the beam 154A, 154B such that the beam 154A, 154B is encapsulated and integrated with the jacket 158A, 158B to form an integrated frame 150A, 146B. The hybrid frame 128 can include many different combinations of foam and beam material compositions. However, in one composition of the hybrid frame 128, the ratio of jacket foam material to beam material is 60:40. The frame 128 is not limited to the structure and arrangement illustrated in FIGS. 3-5 and may be constructed according to an insulated structural member for insulated panels disclosed in U.S. patent application Ser. No. 15/967,675 filed May 1, 2018, and U.S. patent application Ser. No. 15/814,732 filed Nov. 11, 2016, the contents of which are hereby incorporated by reference in their entirety.

In FIG. 5, the hybrid frame joint 126 effectively eliminates air gaps between the male and female components of the first and second frames 150A, 146B, thereby limiting instances of vapor infiltration and condensation between the panels 112A, 112B. The jacket 158A, 158B of each joint member 172A, 170B has a mating surface including a flat portion 190A, 190B, a sloped portion 192A, 192B, and an engaging male 174A, 174B or female 176A, 176B member (e.g., protrusion and groove). The joint members 172A, 170B partially deform as the sloped walls 192A, 192B of the mating surfaces 172A, 170B are compressed together, and close any air gaps between the first and second frames 150A, 146B. Because the joint member 172A, 170B of each frame 150A, 146B is composed of a foam material with a density, for example, in a range of approximately 3 lb/ft$^3$ to approximately 6 lb/ft$^3$, the sloped walls 192A, 192B of each joint member 172A, 170B are configured to compress, for example, by 1/64 of an inch, when the frame 150A of the first panel 112A is coupled to the frame 146B of the second panel 112B. By reducing the instances of air gaps between the two frames 150A, 146B, moisture from the external environment cannot creep in between the panels 112A, 112B and either freeze or erode the frame components. The soft seal joint 126 shown in FIG. 5 eliminates the need for using a sealant, such as butyl. The foam densities described herein are provided for exemplary purposes and are not limited to these particular ranges.

Additionally, the frame joints 126, 126A, 126B are sealed further by compressing a gasket 194 between the flat surfaces 190A, 190B of the joint members 172A, 170B of each frame 150A, 146B. The joint member 172A, 170B of each frame 150A, 146B may sealingly couple with an adjacent joint member in other ways, and, accordingly, the frame joint 126 of the present disclosure is not limited to a tongue and groove coupling joint. Other mating engagements between two adjoining frames may be other female/male coupling joints.

The jacket 158A, 158B and the insulation core 136A, 136B of the body 134A, 134B may have different foam chemistries. A conventional HDR frame has a density of ten (10) to twelve (12) lb/ft$^3$ and a R value of 3.9 to 4.7 per inch to optimize the structural performance, with a core foam density of approximately 2.2 lb/ft$^3$. By comparison, the jacket 158A, 158B of the hybrid frame 128 can achieve a higher R value with a lower density, and can predominantly rely on the strength of the beam 154A, 154B for structural performance. For example, the density of the jacket 158A, 158B may be in a range of approximately three (3) to approximately six (6) lb/ft$^3$, and preferably in the range of three and a half (3.5) and four and a half (4.5) lb/ft$^3$ to reach R values of approximately R6 to R8 per inch. The insulation core 136A, 136B of the hybrid frame 112A, 112B may be made of a foam having a density of approximately 2.2 lb/ft$^3$, such that the ratio of the jacket density to core foam density is in a range of approximately 4:3 to approximately 3:1. In some examples, the foam of the jacket 158A, 158B and the panel body 136A, 136B may be polyurethane foam, such as ELASTOPOR P19080R, P18382R, P18380R. Although the conventional HDR frame is completely composed of foam, the hybrid frame 128 out performs the conventional HDR frame in both thermal and structural performance, as described below. The foam densities described herein are provided for exemplary purposes and, therefore, the ratios of jacket density to core foam density are also exemplary and are not limited to these particular ranges.

The hybrid panel 112 of the freezer or refrigerated enclosure 110 of FIG. 2 has several advantages over conventional insulation panels. While an insulation panel with an HDR frame trades structural reliability with higher insulative properties, the hybrid panel 112 constructed according to the present disclosure is high performing in both thermal insulation and structural reliability. The hybrid frame 128 may provide R values in a range of approximately 4R per inch to approximately 8R per inch. By comparison to an insulation panel 12 with a wooden frame 28 having a 1.25R per inch, the hybrid panel 112 can achieve a higher R value without increasing the thickness of the panel body 134. For example, the thermal resistance of five (5) inch and four (4) inch thick, twenty (20) foot long frames was calculated for each one composed of wood, HDR, and a hybrid frame having a 1:1 ratio of wood beam and foam.

The thermal insulative properties of the hybrid frame 128 of the present disclosure can be better understood in light of the following examples of five (5) inch and four (4) inch frames in Tables 2 and 3, which are merely intended to illustrate the performance values of a hybrid frame 128 and are not meant to limit the scope thereof in any way.

TABLE 2

Comparison of Thermal Performances of 5-inch frame

| Frame Type | Frame Thickness (inches) | R Value (BTU/h) | Total R Value (BTU/h) | Foam Density (lb/ft³) |
|---|---|---|---|---|
| Wood | 1.5 | 1.25 | 6.09 | N/A |
| HDR | 1.5 | 3.90 | 19.01 | 12 |
| Hybrid | .75 Beam | 2.58 | 12.1 | N/A |
|  | .75 Foam | 7.00 | 36.08 | 5.5 |
|  |  |  | 24.09 (Total) |  |

TABLE 3

Comparison of Thermal Performances of 4-inch Frame

| Frame Type | Frame Thickness (inches) | R Value (BTU/h) | Total R Value (BTU/h) | Foam Density (lb/ft³) |
|---|---|---|---|---|
| Wood | 1.5 | 1.25 | 4.84 | N/A |
| HDR | 1.5 | 3.90 | 15.11 | 12 |
| Hybrid | .75 Beam | 2.58 | 10.8 | N/A |
|  | .75 Foam | 7.00 | 28.7 | 5.5 |
|  |  |  | 19.75 (Total) |  |

As shown in Tables 2 and 3, each of the five (5) inch and four (4) inch thick hybrid frames 128 has a total R value (i.e., R 23.34, R 18.56, respectively) that is higher than both the wood frame (i.e., R 6.09, R 4.84) and the HDR frame (i.e., R 19.01, R 15.11) of the same thickness. Notably, even though the HDR frame is composed entirely of foam, the hybrid frame 128 has a higher total R value than that of the HDR frame. In another example, the R-value for a five (5) inch thick hybrid frame 128, is between R24 (using 5 lb/ft³ foam) and R25 (using 4 lb/ft³ foam). The R-value for a four (4) inch thick hybrid frame 128 is between R19 (using 5 lb/ft³) and R20 (using 4 lb/ft³). When using fiber reinforced plastic for the beam material 154, the R-value of the hybrid frame 128 may be in a range of R39 for a five (5) inch thick frame and R31 for a four (4) inch thick frame.

A high thermal resistivity of the hybrid frame leads to energy savings of a freezer or refrigerated enclosure. For example, a refrigeration unit of a freezer or refrigerated enclosure 110 composed of hybrid panels 112 would require less energy to remove heat and to maintain a constant refrigeration temperature. In other words, the hybrid frame 128 increases resistivity for heat to transfer into the enclosure through the frame joint 126 of adjoining panels 112, thus the internal temperature of the enclosure 110 stays cooler for longer because there is less heat to remove from the enclosure 110. Thus, the refrigeration unit of the hybrid panel/enclosure 110 spends less energy to operate (i.e., remove the heat) and to keep the temperature of the enclosure constant. By comparison to a conventional wood framed enclosure 10, a hybrid enclosure 110 with a five (5) inch hybrid frame can save 54,000 kWh/yr and reduces the BTU load by 7.4%. For a four (4) inch hybrid frame enclosure 110, heat gain through enclosure is reduced by 16% and the BTU load is reduced by 3.5% compared to a four (4) inch wood framed enclosure.

Example 1

Turning to a schematic 200 of FIG. 10 and Table 4 below, the strength of the hybrid frame 128 was tested against a wood frame 28W and an HDR frame 28H in a beam span test. The composition of foam and beam material of the hybrid frame 128 provides reliable structural performance, and therefore can be used in more applications (e.g., two-level storage unit designs, high-bearing load applications). The results of the span test 200 are provided below in Table 4.

The hybrid frame 128 in accordance with the disclosure can be better understood in light of the following examples of five (5) inch and four (4) inch frames in Table 4, which is merely intended to illustrate the structural performance values of a hybrid frame and are not meant to limit the scope thereof in any way.

TABLE 4

Comparison of Structural Performance of a 5-inch Frame and a 4-inch Frame

| Frame Type 180" span | 5" L/180 Deflection (lbs) | 5" Failure (lbs) | 4" L/180 Deflection (lbs) | 4" Failure (lbs) |
|---|---|---|---|---|
| Wood | 1109 | 1549 | 977 | 1109 |
| HDR | 1021 | 1153 | <757 | <757 |
| Hybrid | 1153 | 1505 | 1021 | 1109 |

Figure 10:
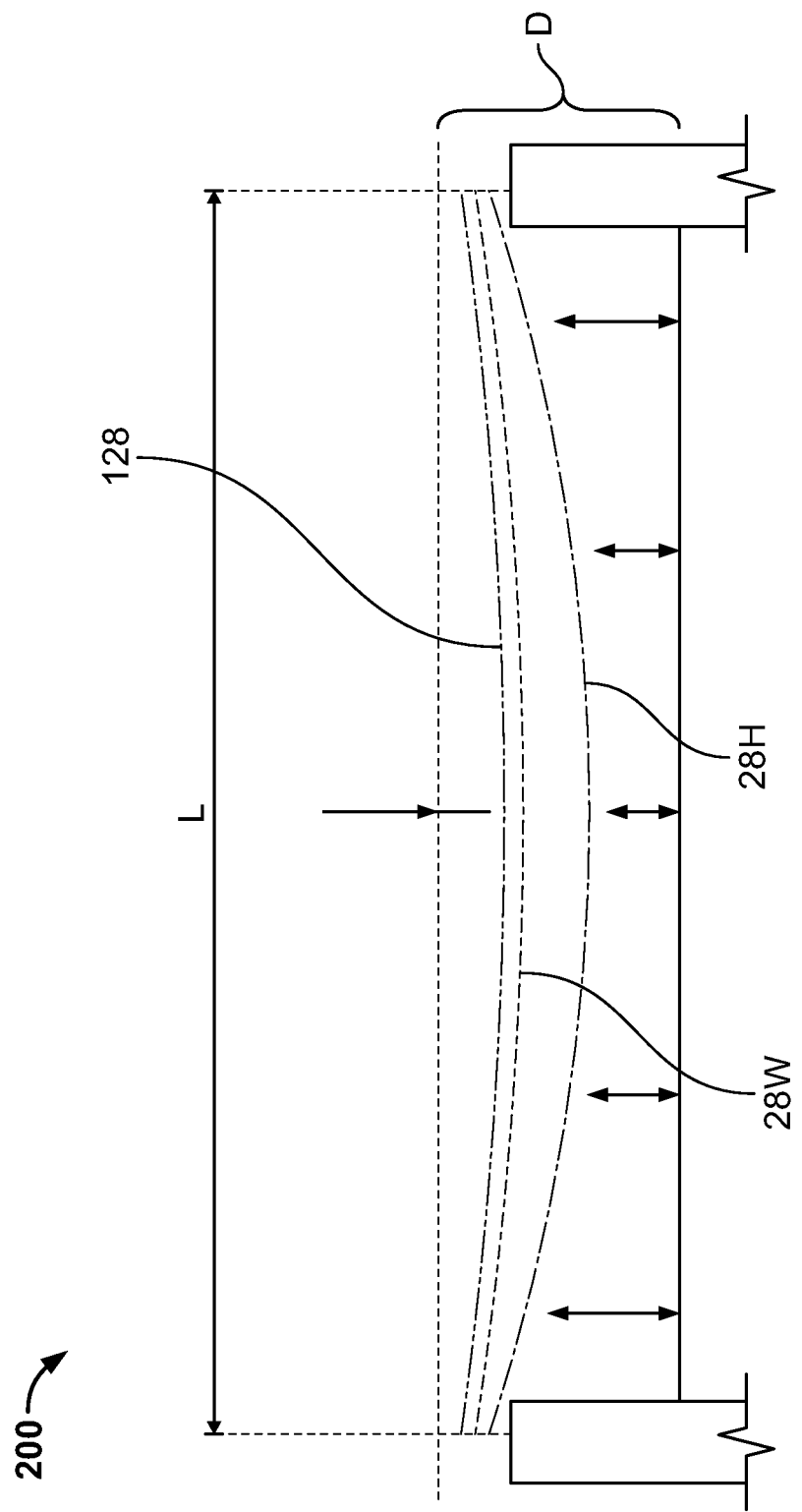
FIG. 10 is a schematic of the deflection of a wood framed panel, an HDR framed panel, and a hybrid frame panel.

As shown in Table 4 and in FIG. 10, the four (4) inch hybrid frame 128 performed better than a four (4) inch wood frame 28W despite the hybrid frame 128 being composed only partially of wood. For example, the four (4) inch wood frame had its limiting deflection at 977 lbs, whereas the four (4) inch hybrid frame had its limiting deflection at 1021 lbs. Both the four (4) inch wood frame and the four (4) inch hybrid frame failed at 1109 lbs, while the four (4) inch HDR frame 28H failed at a load less than 757 lbs. In a stress test, the relative flexural strength of the wood, HDR, and hybrid frames were determined, and the results were based on a 1.5×3.5 inch rectangular cross-sections being subjected to a centered bending force spanning twenty three (23) inches between reaction points. Relative flexural strength of the wood frame 28W was found to be approximately 10,000 psi, relative flexural strength of the HDR frame 28H was found to be approximately 750 psi, and relative flexural strength of the hybrid frame 128 was found to be approximately 950 psi.

The hybrid frame 112 constructed according to the present disclosure may be customized for particular applications to achieve certain thermal and structural properties. For example, the structural or thermal performance of a hybrid frame 128 may be enhanced by altering the foam jacket 158 to beam 154 ratio, foam density, foam chemistry, frame thickness T2, beam thickness, beam material, and orientation of the beam 154 relative to the jacket 158. Generally, the R value of the foam insulation jacket 158 increases when the density of the foam insulation decreases. Thus, the material of the beam 154 and the material of the jacket 158 may be selected to form an integrated frame 128 having an optimal R value and strength. In other examples, the density of the foam insulation may be increased to reduce R value and to increase structural performance. By customizing a hybrid frame 128 and/or panel 112, the hybrid frame 128 and/or panel 112 may be manufactured according to specific requirements of a customer, and may provide flexibility in the design of freezer or refrigerator enclosures 110.

The hybrid frames 146, 150 of the panel 112 provide structural support for the hybrid enclosure 110, while also improving thermal performance three-fold in comparison to a wood framed enclosure 10. Additionally, the hybrid frame 128 is less expensive to manufacture and install as the frame 128, uses less material than a conventional wood or HDR frame, and particularly, less foam material than the HDR frame. As described above, the hybrid enclosure 110 may require less insulation material to achieve a higher R value, thus occupying a smaller footprint, leading to savings in costs related to materials, optimizing space for availability of display and storage of retail products, reduced energy consumption, and reduced shipping costs.

Further, the high performance in thermal resistivity of the frame joint 126 increases performance and reduces costs. For example, the hybrid panel 112 is less susceptible to erosion caused by condensation build up at the joint 126 because heat loss at the joint 126 is minimized. Additionally, the airtight seal formed between two adjoining hybrid frames 128 reduces water exposure to the beam 154 and prevents ice from forming at the hybrid frame joint 126. Further, because the jacket 158 of the frame 128 compresses to form an airtight seal, butyl is not required for sealing the frame joints 126, thus reducing time and costs related to installation and materials, thereby eliminating the adverse problems of working with butyl. Moreover, the foam jacket material is hydrophobic such that the frame 128 does not absorb condensation and therefore isolates the wooden beam 154 from being damaged by moisture. Overall, the high thermal resistivity of the hybrid frame 128 leads to overall efficiency of the freezer or refrigerated enclosure and results in better temperature maintenance, fewer heat swings within the cooling environment, constant temperature within the enclosure, reduced product loss, and improved product maintenance. The higher performing enclosure 110 thus demands less energy consumption from the refrigerated unit, leading to reduced horsepower requirements and yearly savings.

The figures and description provided herein depict and describe preferred examples of a hybrid frame and/or hybrid panel insulating a freezer or refrigerated enclosure for purposes of illustration only. One skilled in the art will readily recognize from the foregoing discussion that alternative examples of the components illustrated herein may be employed without departing from the principles described herein. Thus, upon reading this disclosure, those of skill in the art will appreciate still additional alternative structural and functional designs for hybrid frames and panels that achieve both structural and thermal reliability. Therefore, while particular examples and applications have been illustrated and described, it is to be understood that the disclosed examples are not limited to the precise construction and components disclosed herein. Various modifications, changes and variations, which will be apparent to those skilled in the art, may be made in the arrangement, operation, and details of the methods and components disclosed herein without departing from the spirit and scope defined in the appended claims.

The following table lists elements of the illustrated examples and their associated reference numbers for convenience.

| Ref. No. | Element |
| --- | --- |
| 10 | enclosure (prior art) |
| 12 | insulated panel |
| 14 | first side enclosure |
| 18 | second side of enclosure |
| 24 | wooden frame |
| 26 | frame joint |
| 28H | HDR frame |
| 28W | wood frame |
| 110 | enclosure (invention) |
| 112 | hybrid insulated panel |
| 112A | first hybrid insulated panel |
| 112B | second hybrid insulated panel |
| 114 | first side of enclosure |
| 118 | second side of enclosure |
| 120 | third side of enclosure |
| 122 | fourth side of enclosure |
| 126 | hybrid frame joint |
| 128 | hybrid frame |
| 128A | hybrid frame of wall panel |
| 128B | hybrid frame of floor panel |
| 128C | hybrid frame of ceiling panel |
| 130 | flooring/floor panel |
| 134 | panel body |
| 134A | panel body of first panel |
| 134B | panel body of second panel |
| 136 | foam core |
| 136A | foam core of first panel |
| 136B | foam core of second panel |
| 138 | first end of panel body |
| 138A | first end of first panel body |
| 138B | first end of second panel body |
| 142 | second end of panel body |
| 142A | second end of first panel body |
| 142B | second end of second panel body |
| 146 | first frame |
| 146A | first frame of first panel |
| 146B | first frame of second panel |
| 150 | second frame |
| 150A | second frame of first panel |
| 150B | second frame of second panel |
| 154 | beam |
| 154A | beam of first/second frame of first panel |
| 154B | beam of first/second frame of second panel |
| 158 | jacket |
| 158A | jacket of first/second frame of first panel |
| 158B | jacket of first/second frame of second panel |
| 162 | interior edge |
| 162A | interior edge of first/second frame of first panel |
| 162B | interior edge of first/second frame of second panel |
| 166 | exterior edge |
| 166A | exterior edge of first/second frame of first panel |
| 166B | exterior edge of first/second frame of second panel |
| 168 | locking assembly of wall/wall joint |
| 168A | locking assembly of wall/floor joint |
| 168B | locking assembly of wall/ceiling joint |
| 170 | joint member of first frame |
| 170A | joint member of first frame of first panel |
| 170B | joint member of first frame of second panel |
| 172 | joint member of second frame |
| 172A | joint member of second frame of first panel |
| 172B | joint member of second frame of second panel |
| 174 | protrusion |
| 174A | protrusion of first frame of first panel |
| 174B | protrusion of first frame of second panel |

-continued

| Ref. No. | Element |
|---|---|
| 176 | groove |
| 176A | groove of second frame of first panel |
| 176B | groove of second frame of second panel |
| 178 | metal skin |
| 178A | metal skin of first panel |
| 178B | metal skin of second panel |
| 180 | cam lock |
| 182 | pin |
| 184 | ceiling panel |
| 186 | perpendicular frame member |
| 190A | flat portion of first/second frame of first panel |
| 190B | flat portion of first/second frame of second panel |
| 192A | sloped portion of first/second frame of first panel |
| 192B | sloped portion of first/second frame of second panel |
| 194 | gasket |
| 200 | span test schematic |
| 326 | second exemplary hybrid frame joint |
| 328 | second exemplary hybrid frame |
| 346 | male hybrid frame |
| 350 | female hybrid frame |
| 354 | beam |
| 355 | leg of beam |
| 356 | foot of beam |
| 357 | back wall of beam |
| 358 | jacket |
| 362 | interior edge of male frame |
| 370 | joint member of male frame |
| 372 | joint member of female frame |
| 394 | gasket |
| 526 | third exemplary hybrid frame joint |
| 528 | third exemplary hybrid frame |
| 546 | male hybrid frame |
| 550 | female hybrid frame |
| 554 | beam |
| 558 | jacket |
| 559 | foam material |
| 561 | cavity of beam |
| 570 | joint member of male frame |
| 572 | joint member of female frame |
| 594 | gasket |

What is claimed is:

1. An enclosure for use as a walk-in refrigerator or freezer, the enclosure comprising:
a wall including a first panel and a second panel connected to the first panel, each of the first and second panels comprising:
a body having a first end and a second end; and
a frame coupled to at least one of the first and second ends of the body and comprising:
a beam of a first material;
a jacket of a second material at least partially enclosing the beam; and
an interior edge adjacent to the body and an exterior edge defined by the jacket, the exterior edge opposite the interior edge and defining a joint member;
wherein the joint member of the first panel defines a groove formed in the exterior edge of the frame, and the joint member of the second panel defines a protrusion extending from the exterior edge of the frame and adapted to engage the groove of the joint member of the first panel; and
wherein at least one joint member of the first and second panels includes a deformable portion that compresses when the joint member of the first panel engages with the joint member of the second panel;
wherein the second material has a density of less than 6 pounds per cubic foot; and
wherein the beam of the frame of at least one of the first and second panels includes substantially parallel portions that at least partially enclose an area of the frame.

2. The enclosure of claim 1, wherein the joint member of the first panel and the joint member of the second panel are coupled by interference fit to form a frame joint.

3. The enclosure of claim 2, wherein the frame joint of the first and second panels has a thickness in a range of approximately 3.5 inches to approximately 6 inches and an R value in a range of approximately 15 to approximately 29.

4. The enclosure of claim 1, wherein the joint member of the first panel and the joint member of the second panel form an air-tight seal when the frame of the first panel is coupled to the frame of the second panel through deformation.

5. The enclosure of claim 1, further comprising a locking assembly arranged to couple the first panel to the second panel from an unlocked configuration to a locked configuration, the locking assembly including a hook attached to one of the first and second panels and a pin attached to the other one of the first and second panels, and wherein the joint member of the first panel and the joint member of the second panel engage when the locking assembly is in the locked configuration.

6. The enclosure of claim 1, wherein the first panel further comprises a second frame coupled to the second end of the body, the second frame including a joint member arranged to engage a frame of a different panel.

7. The enclosure of claim 6, wherein the joint member of the second frame defines a protrusion extending from an exterior surface of the joint member.

8. The enclosure of claim 6, wherein the joint member of the second frame defines a groove defined in an exterior surface of the joint member.

9. The enclosure of claim 1, wherein the jacket includes a foam material having a first density and the body includes a foam material having a second density different than the first density.

10. The enclosure of claim 9, wherein a ratio of first density to second density is in a range of approximately 4:3 to approximately 3:1.

11. The enclosure of claim 9, further comprising metal plating adjacent to the foam material of the body.

12. The enclosure of claim 1, further comprising:
a ceiling coupled to the wall, the ceiling including a different panel comprising:
a body having a first end and a second end; and
a frame coupled to the first end of the body and comprising:
a beam of the first material; and
a jacket of the second material at least partially enclosing the beam.

13. The enclosure of claim 1, further comprising:
a floor coupled to the wall, the floor including a different panel comprising:
a body having a first end and a second end; and
a frame coupled to the first end of the body and comprising:
a beam of the first material; and
a jacket of the second material at least partially enclosing the beam.

14. The enclosure of claim 12, wherein the panel of the ceiling is perpendicular to the panel of the wall.

15. A frame joint for a freezer or refrigerated wall, the frame joint comprising:

a first frame of an insulated panel, the first frame including a beam of a first material and a jacket of a second material, the jacket at least partially enclosing the beam such that the beam is embedded in the jacket;

a second frame of an insulated panel, the second frame arranged to couple to the first frame, the second frame including a beam of the first material and a jacket of the second material, the jacket at least partially enclosing the beam such that the beam is embedded in the jacket;

a mating surface defined in the jacket of the first frame;

a mating surface defined in the jacket of the second frame;

an average R value of at least R5 per inch when the mating surface of the first frame is sealingly coupled to the mating surface of the second frame; and wherein the beam of at least one of the first frame and the second frame includes substantially parallel portions that at least partially enclose an area of the frame.

16. The frame joint of claim 15, wherein the mating surface of the first frame defines a deformable portion that compresses when the mating surface of the first frame engages with the mating surface of the second frame.

17. The frame joint of claim 15, wherein the mating surface of the first frame defines a groove in the jacket and the mating surface of the second frame defines a protruding member extending from the jacket of the second frame, a portion of the jacket of the first frame being compressible when the protrusion engages with the groove.

18. The frame joint of claim 15, wherein the first frame and the second frame are co-linear.

19. The frame joint of claim 15, further comprising a gasket disposed between the mating surface of the first frame and the mating surface of the second frame.

20. The frame joint of claim 15, wherein the first and second frames have a thickness in a range of approximately 3.5 inches to approximately 6 inches and a total R value in a range of approximately 15 to approximately 29 when the first frame and the second frame are coupled.

21. The frame joint of claim 15, wherein the mating surface of the first frame and the mating surface of the second frame form an air-tight seal when the first frame and the second frame are coupled.

22. The frame joint of claim 15, wherein the first frame has a composition ratio of first material to second material in a range of approximately 1:2 to approximately 1:4.

23. The frame joint of claim 22, wherein the first frame has a composition ratio of first material to second material of approximately 2:3.

24. The frame joint of claim 15, wherein the beam of the first frame has a flexural strength greater than a flexural strength of the jacket.

25. A panel for a freezer or refrigerated wall, the panel comprising:
a body having a first end and a second end;
a frame operably coupled to the first end of the body, the frame comprising:
a beam of a first material; and
a jacket of second material, the jacket at least partially enclosing the beam so that the beam is integrated with the jacket;
an interior edge coupled to the first end of the body and an exterior edge defining a mating surface, the mating surface arranged to engage with a second frame to define a frame joint; and
wherein the first material has a flexural strength greater than a flexural strength of the second material;
wherein the second material has a density of less than 6 pounds per cubic foot; and
wherein the beam includes a first parallel portion and a second parallel portion at least partially enclosing an area of the frame.

26. The panel of claim 25, wherein the frame has a flexural strength in a range of approximately 800 psi to approximately 1000 psi, and a total R value in a range of 19 to approximately 25.

27. The panel of claim 25, wherein the frame has a composition ratio of first material to second material in a range of approximately 1:2 to approximately 1:4.

28. The panel of claim 25, wherein the body has a density of the second material and the jacket has a density different than the density of the body.

29. The panel of claim 28, wherein the density of the body is less than the density of the jacket.

30. The panel of claim 29, wherein a ratio of the density of the jacket to the density of the body is in a range of approximately 4:3 to approximately 3:1.

31. The panel of claim 25, wherein the beam is disposed between the body and the jacket.

32. The panel of claim 25, wherein the first material is a wood and the second material is a foam.

33. The panel of claim 25, wherein the mating surface of the jacket includes a compressible portion extending away from the exterior edge.

34. The panel of claim 25, further comprising a second frame coupled to the second end of the body.

35. The panel of claim 25, wherein the beam is C-shaped.

36. The panel of claim 25, wherein the area is defined by the beam and includes a cavity filled with a foam material.

37. The panel of claim 25, wherein the beam is a fiberglass reinforced plastic resin.

* * * * *